United States Patent
Sugiimoto

(10) Patent No.: US 7,629,925 B2
(45) Date of Patent: Dec. 8, 2009

(54) POSITIONING APPARATUS

(76) Inventor: Sueo Sugiimoto, 6-1-5 Higashi-nakahama, Joto-ku, Osaka-shi, Osaka 536-0023 (JP)

( * ) Notice: Subject to any disclaimer, the term of this patent is extended or adjusted under 35 U.S.C. 154(b) by 145 days.

(21) Appl. No.: 11/909,093

(22) PCT Filed: Mar. 20, 2006

(86) PCT No.: PCT/JP2006/305559

§ 371 (c)(1), (2), (4) Date: Sep. 19, 2007

(87) PCT Pub. No.: WO2006/101078

PCT Pub. Date: Sep. 28, 2006

(65) Prior Publication Data

US 2009/0066572 A1 Mar. 12, 2009

(30) Foreign Application Priority Data

Mar. 22, 2005 (JP) .............................. 2005-080911

(51) Int. Cl.
*G01S 1/02* (2006.01)
*G01S 5/14* (2006.01)

(52) U.S. Cl. .............................. 342/357.12; 342/357.04

(58) Field of Classification Search ............ 342/357.02, 342/357.04, 357.12, 357.15; 701/207, 214
See application file for complete search history.

(56) References Cited

U.S. PATENT DOCUMENTS 6,373,432 B1 * 4/2002 Rabinowitz et al. ..... 342/357.16

2003/0154049 A1 8/2003 Toda

FOREIGN PATENT DOCUMENTS

JP 2003-098245 4/2003
JP 2003-232845 8/2003

OTHER PUBLICATIONS

International Search Report for corresponding Application No. PCT/JP2006/305559 mailed May 2, 2006.
The Geodetic Society of Japan, [(in Japanese) Shinteiban GPS-Jinko-eisei-niyoru seimitsusokutei system-(A new edition GPS—A precise positioning system-)], Japan Association of Surveyors, Nov. 15, 1989, pp. 121-140. (Cited on p. 2, line 2 of the description).
Sidharth Nair, "Multiple Antenna GPS Configuration for Enhanced Performance", Proceedings of the ION $60^{th}$ Annual Meeting, Jun. 2006, pp. 188-199. (Copy to be provided).

* cited by examiner

*Primary Examiner*—Dao L Phan
(74) *Attorney, Agent, or Firm*—Renner, Otto, Boisselle & Sklar, LLP

(57) ABSTRACT

A positioning apparatus and a point positioning method which estimated with high accuracy with only one linear regression equation is provided. The positioning apparatus (10) includes the two GPS receivers (1A), (1B) which connect to the GPS antennas (21), (22). The data of the satellites is detected and a navigation message is analyzed. And an item that the output data from the both GPS receivers (1A), (1B) respectively are related to the signals transmitted from the same satellites is verified and a matched data is given to a positioning operating device (4). The positioning operating device (4) estimates every position of the GPS receivers (antennas) and the positions of the satellites by utilizing only one linear regression equation which the given data is applied to. The positioning operating device (4) detects a position of the positioning apparatus by using the positions of the two GPS receivers.

5 Claims, 2 Drawing Sheets

POSITIONING APPARATUS

TECHNICAL FIELD

This invention relates to a positioning apparatus configured to estimate a receiver's position by utilizing the satellite signals.

BACKGROUND ART

Various types of a positioning apparatus which estimate the position utilizing the satellite signals from the satellites are disclosed. There are two kinds of the positioning methods for the positioning apparatus, one is a point positioning and the other is a differential positioning. A basic estimation of the point positioning is to derive a nonlinear simultaneous equation comprising a receiver's position (error) in three dimensions and a clock error of the receiver as the unknown values from a code pseudorange. And applying a Newton method, an extended Kalmann Filter to this nonlinear samultaneous equation, the point positioning could be estimated. The various types of a method to eliminate an influence of an ionosphere and a troposphere are disclosed. One method set a delay of the ionosphere and a delay of the troposphere to "0" at initial condition. And the other method estimates these delays utilizing a phase difference such as a single phase difference.

The Geodetic Society of Japan, [Shinteiban GPS—Jinko-eisei-niyoru seimitsu-sokutei system—(in Japanese), A new edition GPS—A precise positioning system—], JAPAN ASSOCIATION OF SURVEYORS, Nov. 15, 1989, p. 121-140

DISCLOSURE OF THE INVENTION

A conventional point positioning apparatus and method utilizing the code pseudorange estimates the position by ignoring the actual values such as a delay of the ionosphere, a delay of the troposphere, the errors of the satellites' orbits, and the clock errors of the satellites. Or the conventional point positioning apparatus and method have estimated the position not until an estimation result has a satisfactory accuracy. Consequently the estimation result is varied widely. So we could not estimate the position with high accuracy. Furthermore applying a single phase difference to the equation with the code pseudorange, a delay data of the ionosphere, and a delay data of the troposphere, the estimation result could have higher accuracy. But this using of the single phase difference in the estimation makes an estimation process more complicated. And the estimation result is varied more widely under an influence of setting the threshold values of noises after the estimation process with the single phase difference. Despite a complication of the estimation process, the estimation result could not have so high accuracy. And this complication makes a processing speed very slow.

A feature of the invention is to provide the positioning apparatus that estimates the receiver's position with high accuracy and without a complicated estimation process.

A positioning apparatus of the invention includes the antennas which receive satellites signals transmitted from satellites and whose distances from one to another are configured. A positioning apparatus of the invention includes the receivers which are set with every antennas respectively and demodulate the satellite signals inputted from the antennas. A positioning apparatus of the invention includes a position estimating device. The position estimating device linear-approximates the positions of receivers with a Linear Taylor series expansion about the estimated positions of the receivers by using the estimation results of the previous positions of the receivers and the positions of the satellites with a Linear Taylor series expansion about the orbital positions of the satellites by using the estimated orbital positions of the satellites from a broadcast orbit data. The position estimating device sets up objective variables, as observable values, that include carrier phase integrated values and code pseudoranges related to distances between the antennas and the satellites. The position estimating device sets up explanatory variables, as unknown values, that include integer ambiguities, clock errors of the receivers, the positions of receivers, clock errors of the satellites, and the orbital positions of the satellites. The position estimating device sets up a regression equation whose operational elements set by an approximate matrix derived from the linear-approximation. And the position estimating device estimates at least the positions of receivers and the integer ambiguities by using the regression equation, and detects a point position of the positioning apparatus with the positions of the receivers and the distances of the receivers each other.

In this aspect, the carrier phase integrated values and the code pseudoranges related to distances between the antennas and the satellites are the observable values. The receivers' positions in three dimensions, the clock errors of the receivers, the clock errors of every satellite, the orbital positions of the satellites, the integer ambiguities are the unknown values. And the linear regression equation with the objective variables consisting of the observable values and the explanatory variables consisting of the unknown values is derived. The approximate matrix is applied to the operational elements of the linear regression equation. The approximate matrix derived from the linear-approximation which linear-approximates the positions of the receivers with the Linear Taylor series expansion about the estimated positions of the receivers by using the estimation results of the previous positions of the receivers and the positions of the satellites with the Linear Taylor series expansion about the orbital positions of the satellites from a broadcast orbit data. By estimating with this linear regression equation every epoch, the unknown values which include the integer ambiguities, the clock errors of the receivers, and the positions of receivers are estimated. At this point, even though the number of the receivers is plural, the number of the linear regression equation is only one.

In an another aspect of the invention, the pointing apparatus comprise a satellite's orbit data getting device which gets orbit data of the satellites from a navigation message or estimated values by off-line processing. And the position estimating device applies the orbit data of the satellites to the regression equation and estimates the positions of receivers.

In this aspect, adding the orbit data of the satellites as the observable value to the objective variable of the linear regression equation and the positions of the satellites as the unknown values to the explanatory variables, the positions of the satellites could be estimated with this linear regression equation.

In another aspect of the invention, the position estimating device applies a Kalmann Filter to the regression equation.

In this aspect, applying the Kalmann Filter, the position of the receiver on moving could be estimated, too.

In another aspect of the invention, the position estimating device estimates a geometric center point of the antennas.

In this aspect, using the geometric center position of the antennas, a variance and a standard deviation of the estimated position could get lower.

In another aspect of the invention, the number of the antennas and the receivers are two.

In this aspect, because the number of the antennas and the receivers, an accuracy of the estimation is higher than the estimation with an antenna and a receiver. And a configuration of the apparatus is smaller than an apparatus with the greater or equal three antennas and receivers.

EFFECTS OF THE INVENTION

According to this invention, utilizing only a regression equation, the receivers' positions whose distances have been predetermined could be estimated with high accuracy. And utilizing these estimation results and the distances, an estimation accuracy of the apparatus's position could be very high. And this estimation process uses only one regression equation, so the estimation process could be simpler, and the position could be estimated quickly and with a short estimation process.

In another aspect of the invention, applying the orbit data of the satellites to the regression equation, the positions of the satellites could be estimated. The distances between the receiver and each satellite could be estimated with high accuracy. So the position of the receiver could be estimated with higher accuracy.

In another aspect of the invention, applying the Kalmann Filter, the position of not only the fixed receiver but also the movable receiver could be estimated.

In another aspect of the invention, utilizing the geometric center of the antennas, the estimation result could have higher accuracy.

In another aspect of the invention, making the number of the antennas and receivers as two, the positioning apparatus could be small yet get the very high-accuracy estimation result of the position.

EXPLANATION OF REFERENCE NUMBERS

10—a positioning apparatus
1A, 1B—a GPS receiver
2—a navigation message analysis device
3—a satellite information processing device
4—a position operating device

THE BEST MODE FOR CARRYING OUT THE INVENTION

With reference to the accompanying drawing, an embodiment of the invention which is a positioning apparatus will be described below. The following explanation of the embodiment explains GPS (Global Positioning System), but could apply to other all GNSS (Global Navigation Satellite System).

Figure 1:
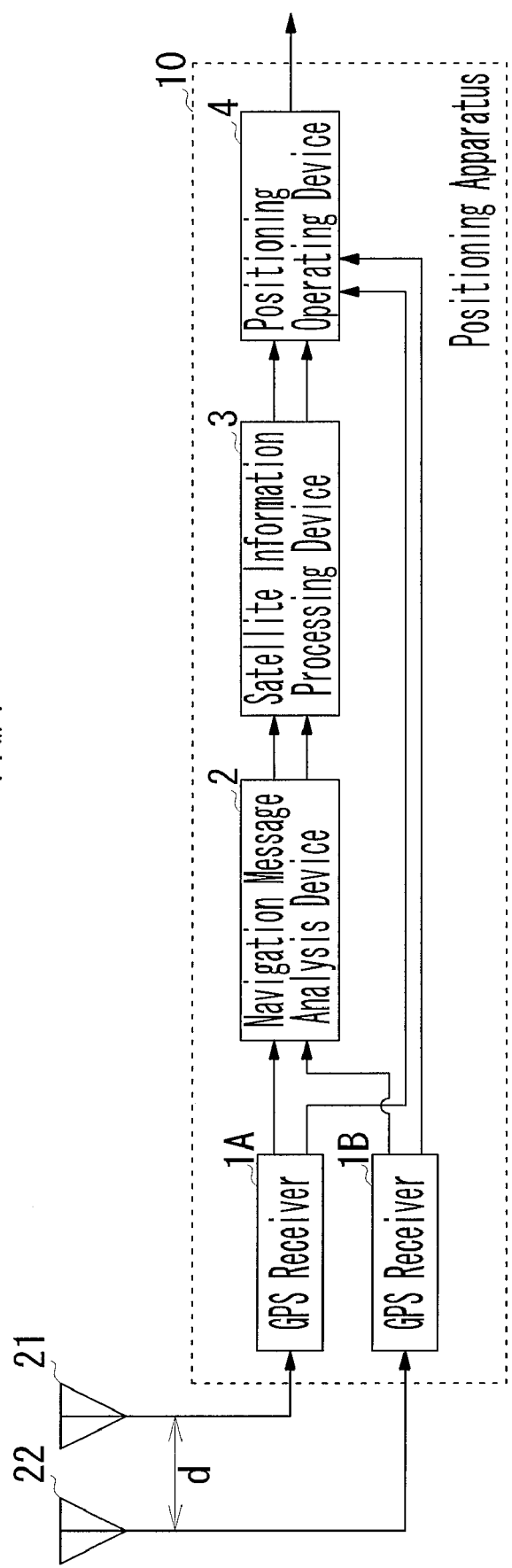
FIG. 1 is a block diagram illustrating an embodiment of the positioning apparatus.
Figure 2:
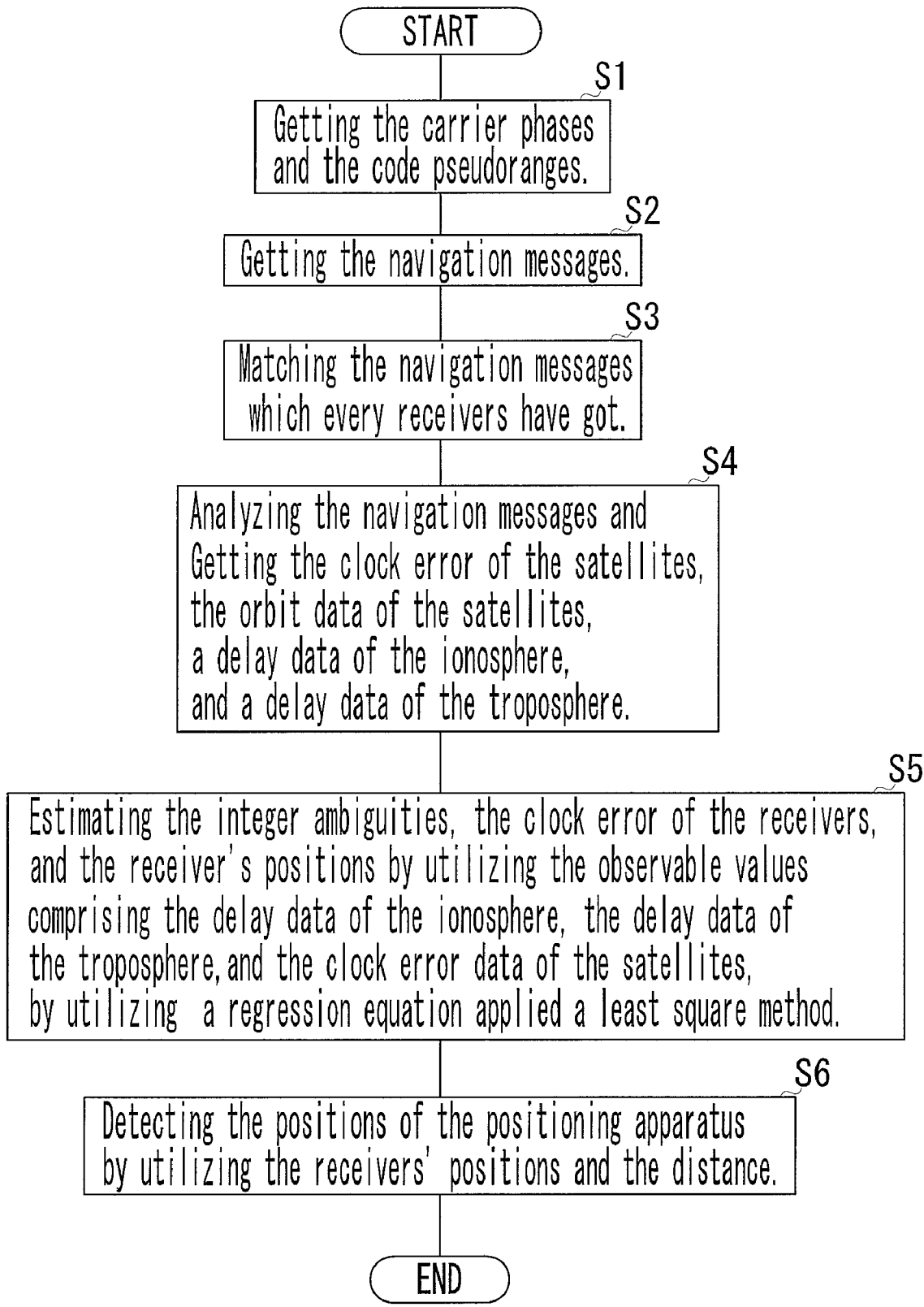
FIG. 2 is a flowchart illustrating an estimation process of the positioning apparatus.

FIG. 1 is a block diagram illustrating an embodiment of the positioning apparatus. And FIG. 2 is a flowchart illustrating an estimation process of the positioning apparatus.

As shown FIG. 1, a point positioning apparatus 10 includes two GPS receivers 1A, 1B, a navigation message analysis device 2, a satellite information processing device 3, and a positioning operating device 4. The GPS receiver 1A connects to the GPS antenna 21, and the GPS receiver 1B connects to the GPS antenna 22 too. A distance d between the GPS antenna 21 and the GPS antenna 22 is set a prescribed value and memorized in a memory which is not shown in the figure.

The GPS antenna 21, 22 receive the satellites' signals from the GPS satellites (positioning satellites), and output the signals to the GPS receivers 1A, 1B respectively. Each GPS receivers 1A, 1B gets the carrier phases of the carrier waves and the code pseudoranges from the inputted GPS signals, utilizing a well-known method. Each GPS receivers 1A, 1B gets the navigation messages which are superimposed on the carrier waves (S1, S2). Each GPS receivers 1A, 1B outputs the navigation messages to the navigation message analysis device 2 respectively, and outputs the carrier phase integration values and the code pseudoranges to the positioning operating device respectively.

The navigation message analysis device 2 analyzes the inputted navigation message, so the navigation message analysis device 2 gets the delay data of the ionosphere, the clock errors of the respective satellites, and the orbit data of the satellites. The navigation message analysis device 2 gets the delay data of the troposphere by using a well-known estimation model. The navigation message analysis device 2 outputs the delay data of the ionosphere, the orbit data of the satellites, and the delay data of the troposphere to the satellite information processing device 3 (S2).

In reference to the ephemeris data, the satellite information processing device 3 chooses the GPS satellites which utilize for point positioning estimation. At this time the satellite information processing device 3 chooses the GPS satellites as the information of each GPS satellites outputted form the GPS receiver 1A and one outputted from the GPS receiver 1B are matched. More specifically, the satellite information processing device 3 chooses only the satellites whose information are outputted from the both GPS receivers 1A, 1B (S3). The satellite information processing device 3 outputs the clock error data, the orbit data, the delay data of the ionosphere, and the delay data of the troposphere which are related to the chosen GPS satellites.

The positioning operating device 4 sets up the linear regression equations of each GPS receivers by utilizing the inputted observation values. The inputted observation values includes the carrier phase integration values, the code pseudoranges, the clock error data, the delay data of the ionosphere, and the delay data of the troposphere. And by applying a least-square method to the regression equations, the positioning operating device 4 estimates the integer ambiguities N1, N2 for each combination the GPS receivers and the GPS satellites, and the receivers' positions u1, u2. Applying the Kalmann Filter to these linear regression equations, the positions of the GPS satellites and the receiver which are moving could be estimated. The value equivalent for an explanatory variable of the linear regression equation is applied a dynamic equation by the well-known model. This estimating process is repeated until a variation of the estimation result come down to a predetermined threshold. So when the variation of the estimation result comes down to the predetermined threshold, the estimation result is assumed to converge (S5). The positioning operating device 4 calculates a position of the positioning apparatus which includes the GPS receivers 1A, 1B, using the two positions of the GPS receivers 1A, 1B and a predetermined distance d. For example, the positioning operating device 4 calculates a point midway between the two antennas 21, 22 (S6).

And described above, a way of estimating the receivers' positions u1, u2 is shown, but setting a condition of constraint related with the receivers' positions u1, u2 and the predetermined geometric distance d, a geometric point midway between the receivers' positions u1, u2 could be estimated. So using this estimation which estimates the point midway of the receivers' positions, a variance of the estimated point midway value reduces by half. So the estimation result could have higher accuracy.

The navigation message analysis device 2, the satellite information processing device 3, and the positioning operating device 4 are comprised of an arithmetic logical unit like a microprocessor which operates the algorithm described below. These devices are comprised of the arithmetic logical units respectively or are comprised of only arithmetic logical unit.

According the present embodiment, the point positions of the two receivers (antennas) could be estimated respectively with high accuracy. And using the high accurate two receivers' (antennas') position, the point position of the point midway could be estimated with very high accuracy.

Next described below is a minute detail relating to an estimation algorithm which estimates the integer ambiguity and the GPS receivers' positions u1, u2. In a description below we put the carrier phase integration values to a carrier phase.

Generally an observation equation of the carrier phase $\phi^p_{L,u}$ is described by an expression (1), and an observation equation of the code pseudorange $\rho^p_{L,u}$ is described by an expression (2). Meanwhile, an error of a multipass is so small that we could ignore the multipass.

[Expression 1]

$$\varphi^p_{L,u}(t) = \frac{1}{\lambda_L}\{r^p_u(t, t-\tau^p_u) - \delta I^p_u(t) + \delta T^p_u(t) + c[\delta t_u(t) - \delta t^p(t-\tau^p_u)]\} + \quad (1)$$
$$N^p_{L,u} + \varepsilon^p_{L,u}(t)$$

$$\rho^p_{c,u}(t) = r^p_u(t, t-\tau^p_u) + \delta I^p_u(t) + \delta T^p_u(t) + c[\delta t_u(t) - \delta t^p(t-\tau^p_u)] + e^p_{c,u}(t) \quad (2)$$

where $\lambda_L$ is a wavelength of L carrier wave, $r^p_u(t,t-\tau^p_u)$ is a geometric distance between the receiver u at the time t and the satellite p at the time $t-\tau^p_u$. Thus $\tau^p_u$ denotes a travel time from the satellite p to the receiver u. $\delta I^p_u(t)$ is the delay of the ionosphere to the L1 carrier wave, $\delta T^p_u(t)$ is the delay of the troposphere to the L1 and L2 carrier wave. $\delta t_u(t)$ is a clock error of the receiver u in the true time t, $\delta t^p(t-\tau^p_u)$ is a clock error of the GPS satellite p by time $(t-\tau^p_u)$. $N^p_{L,u}(t)$ is the integer ambiguity concerned with the distance between the receiver u and the satellite p, $\epsilon^p_{L,u}(t)$, $e^p_{L,u}(t)$ are the observation noises respectively.

And define $\phi^p_{L,u} = \lambda_L \varphi^p_{L,u}$, $f_{L1}$ is a frequency of the L1 carrier wave, $f_{L2}$ is a frequency of the L2 carrier wave. Applying these definition to the expression (1), (2) the observation equation of the CA code pseudorange $\rho^p_{CA,u}$ is re-described by an expression (3), the observation equation of the P,Y code pseudorange $\rho^p_{PY,u}$ is re-described by an expression (4). And the observation equation of the L1 carrier phase $\Phi^p_{L1,u}$ is re-described by an expression (5), the observation equation of the L2 carrier phase $\Phi^p_{L2,u}$ is re-described by an expression (6).

[Expression 2]

$$\rho^p_{CA,u}(t) = \quad (3)$$
$$r^p_u(t, t-\tau^p_u) + \delta I^p_u(t) + \delta T^p_u(t) + c[\delta t_u(t) - \delta t^p(t-\tau^p_u)] + e^p_{CA,u}(t)$$

-continued $$\rho^p_{P,u}(t) = \quad (4)$$
$$r^p_u(t, t-\tau^p_u) + \frac{f^2_{L1}}{f^2_{L2}}\delta I^p_u(t) + \delta T^p_u(t) + c[\delta t_u(t) - \delta t^p(t-\tau^p_u)] + e^p_{P,u}(t)$$

$$\Phi^p_{L1,u}(t) = r^p_u(t, t-\tau^p_u) - \delta I^p_u(t) + \delta T^p_u(t) + \quad (5)$$
$$c[\delta t_u(t) - \delta t^t(t-\tau^p_u)] + \lambda_{L1} N^p_{L1,u} + \lambda_{L1}\varepsilon^p_{L1,u}(t)$$

$$\Phi^p_{L2,u}(t) = r^p_u(t, t-\tau^p_u) - \frac{f^2_{L1}}{f^2_{L2}}\delta I^p_u(t) + \delta T^p_u(t) + \quad (6)$$
$$c[\delta t_u(t) - \delta t^p(t-\tau^p_u)] + \lambda_{L2} N^p_{L2,u} + \lambda_{L2}\varepsilon^p_{L2,u}(t)$$

And now the distance between the receiver and the GPS satellite p $r^p_u(t,t-\tau^p_u)$ is re-described by an expression (7).

[Expression 3]

$$r^p_u(t) \equiv r^p_u(t, t-\tau^p_u) = \sqrt{\begin{array}{l}(x_u(t) - x^p(t-\tau^p_u))^2 + \\ (y_u(t) - y^p(t-\tau^p_u))^2 + \\ (z_u(t) - z^p(t-\tau^p_u))^2\end{array}} \quad (7)$$

At this point we apply a Linear Taylor series expansion to an unknown receiver's position $u(t)=[x_u(t), y_u(t), z_u(t)]^T$ with a priori estimation of the receiver's position $u^{(j)}(t)=[x_u^{(j)}(t), y_u^{(j)}(t), z_u^{(j)}(t)]^T$. And we apply the Linear Taylor series expansion to a satellite orbit position $s^p$ with a priori orbit position $se^p$ which included in the broadcasting orbit data. And more we apply a linear approximation to the distance $r^p_u(t)$. So the following equations (the equations (8), (9)) should be derived mathematically.

[Expression 4]

$$r^p_u \cong r^p_{u(j)} + \left[\frac{\delta r^p_u}{\delta u}\right]^T_{u=u(j)}(u - u^{(j)}) \quad (8)$$

$$g^{p,(j)} \equiv \left[\frac{\delta r^p_{u(j)}}{\delta u^{(j)}}\right]^T \quad p = 1, 2, \ldots, ns \quad (9)$$

This linear approximation equation is assigned to the expression (3)-(6) and applying the expressions (10), (11) to the expression (3)-(6).

$$\Phi e^{p,(j)}_{L,u} = \Phi^{p,(j)}_{L,u} - (r_u^{(j)p} - g^{p,(j)}u^{(j)}) \quad (10)$$

$$\rho e^{p,(j)}_{Code,u} = \rho^{p,(j)}_{Code,u} - r_u^{(j)p} + g^{p,(j)}u^{(j)} \quad (11)$$

Expression 5

These application and assignment derives the following expressions.

[Expression 6]

$$\rho e^{p,(j)}_{CA,u} \cong g^{p,(j)}u + \delta I^p_u + \delta T^p_u + c[\delta t_u - \delta t^p] + e^p_{CA,u} \quad (12)$$

$$\rho e^{p,(j)}_{P,u} \cong g^{p,(j)}u + \frac{f^2_1}{f^2_2}\delta I^p_u + \delta T^p_u + c[\delta t_u - \delta t^p] + e^p_{P,u} \quad (13)$$

$$\Phi e^{p,(j)}_{L1,u} \cong g^{p,(j)}u - \delta I^p_u + \delta T^p_u + c(\delta t_u - \delta t^p) + \lambda_{L1} N^p_{L1,u} + \lambda_{L1}\varepsilon^p_{L1,u} \quad (14)$$

-continued $$\Phi e_{L2,u}^{P,(j)} \cong g^{P,(j)} u - \frac{f_{L1}^2}{f_{L2}^2} \delta I_u^P + c(\delta t_u - \delta t^P) + \lambda_{L2} N_{L2,u}^P + \lambda_{L2} \varepsilon_{L1,u}^P \quad (15)$$

These expressions (12)-(15) denotes the approximate linear regression equations that are comprised of some objective variables and some explanatory variables. The objective variables are comprised of the carrier phases, the code pseudoranges. The explanatory variables are comprised of the receiver's position, the delay of the ionosphere, the delay of the troposphere, the integer ambiguity.

Define the matrixes which include the linear approximated elements as the expressions (16), (17).

[Expression 7]

$$G_u^{(j)} = \begin{bmatrix} \frac{\delta r_{u(j)}^1}{\delta x_u^{(j)}} & \frac{\delta r_{u(j)}^1}{\delta y_u^{(j)}} & \frac{\delta r_{u(j)}^1}{\delta z_u^{(j)}} \\ \frac{\delta r_{u(j)}^2}{\delta x_u^{(j)}} & \frac{\delta r_{u(j)}^2}{\delta y_u^{(j)}} & \frac{\delta r_{u(j)}^2}{\delta z_u^{(j)}} \\ \cdots & \cdots & \cdots \\ \frac{\delta r_{u(j)}^{ns}}{\delta x_u^{(j)}} & \frac{\delta r_{u(j)}^{ns}}{\delta y_u^{(j)}} & \frac{\delta r_{u(j)}^{ns}}{\delta z_u^{(j)}} \end{bmatrix} = \begin{bmatrix} g_u^1 \\ g_u^2 \\ \cdots \\ g_u^{ns} \end{bmatrix} \quad (16)$$

$$G_{D,u}^{(j)} = \begin{bmatrix} g_u^1 & 0 & \cdots & \cdots & 0 \\ 0 & g_u^1 & 0 & & 0 \\ \vdots & & \ddots & & \vdots \\ \vdots & & & \ddots & \vdots \\ 0 & \cdots & \cdots & 0 & g_u^{ns} \end{bmatrix} \quad (17)$$

The expressions (12)-(15) are re-described to the following expressions.

[Expression 8]

$$\begin{bmatrix} \rho e_{CA,u}^{(j)} \\ \rho e_{PY,u}^{(j)} \\ \Phi e_{L1,u}^{(j)} \\ \Phi e_{L2,u}^{(j)} \end{bmatrix} = \begin{bmatrix} G_u^{(j)} & 1 & 0 & 0 & -G_{D,u}^{(j)} & -I & I & I \\ G_u^{(j)} & 1 & 0 & 0 & -G_{D,u}^{(j)} & -I & \frac{f_{L1}^2}{f_{L2}^2} I & I \\ G_u^{(j)} & 1 & I & 0 & -G_{D,u}^{(j)} & -I & -I & I \\ G_u^{(j)} & 1 & 0 & I & -G_{D,u}^{(j)} & -I & -\frac{f_{L1}^2}{f_{L2}^2} I & I \end{bmatrix} \begin{bmatrix} u \\ c\delta t_u \\ \lambda_{L1} N_{L1,u} \\ \lambda_{L2} N_{L2,u} \\ p \\ c\delta t^P \\ \delta I_u \\ \delta T_u \end{bmatrix} + \begin{bmatrix} e_{CA,u}^P \\ e_{PY,u}^P \\ \lambda_{L1} \varepsilon_{L1,u}^P \\ \lambda_{L2} \varepsilon_{L2,u}^P \end{bmatrix} \quad (18)$$

Applying the observable values of the code pseudorange and the carrier phase to this linear regression equation and using the least-square method, the receiver's position u and the integer ambiguity N could be estimated. At the same time the position of the satellite s and the clock error of the satellite $c\delta t^s$ could be estimated.

Applying this linear regression equation to estimation of the two receivers' positions u1, u2, an expression (18) derives a following expression. The GPS receiver 1A, 1B are equipped on the same positioning apparatus, so the delay of the ionosphere and the delay of the troposphere could be assumed same for the GPS receiver 1A, 1B. So an expression (19) is denoted.

[Expression 9]

$$\begin{bmatrix} \rho e_{CA,u1}^{(j)} \\ \rho e_{PY,u1}^{(j)} \\ \Phi e_{L1,u1}^{(j)} \\ \Phi e_{L2,u1}^{(j)} \\ \rho e_{CA,u2}^{(j)} \\ \rho e_{PY,u2}^{(j)} \\ \Phi e_{L1,u1}^{(j)} \\ \Phi e_{L2,u2}^{(j)} \end{bmatrix} = \quad (19)$$

$$\begin{bmatrix} G_{u1}^{(j)} & 1 & 0 & 0 & -G_{D,u1}^{(j)} & -I & I & I & 0 & 0 & 0 & 0 \\ G_{u1}^{(j)} & 1 & 0 & 0 & -G_{D,u1}^{(j)} & -I & \frac{f_{L1}^2}{f_{L2}^2} I & I & 0 & 0 & 0 & 0 \\ G_{u1}^{(j)} & 1 & I & 0 & -G_{D,u1}^{(j)} & -I & -I & I & 0 & 0 & 0 & 0 \\ G_{u1}^{(j)} & 1 & 0 & I & -G_{D,u1}^{(j)} & -I & -\frac{f_{L1}^2}{f_{L2}^2} I & I & 0 & 0 & 0 & 0 \\ 0 & 0 & 0 & 0 & -G_{D,u2}^{(j)} & -I & I & I & G_{u2}^{(j)} & 1 & 0 & 0 \\ 0 & 0 & 0 & 0 & -G_{D,u2}^{(j)} & -I & \frac{f_{L1}^2}{f_{L2}^2} I & I & G_{u2}^{(j)} & 1 & 0 & 0 \\ 0 & 0 & 0 & 0 & -G_{D,u2}^{(j)} & -I & -I & I & G_{u2}^{(j)} & 1 & 0 & 0 \\ 0 & 0 & 0 & 0 & -G_{D,u2}^{(j)} & -I & -\frac{f_{L1}^2}{f_{L2}^2} I & I & G_{u2}^{(j)} & 1 & 0 & 0 \end{bmatrix}$$

$$\begin{bmatrix} u1 \\ c\delta t_{u1} \\ \lambda_{L1} N_{L1,u1} \\ \lambda_{L2} N_{L2,u1} \\ p \\ c\delta t^P \\ \delta I_u \\ \delta T_u \\ u2 \\ c\delta t_{u2} \\ \lambda_{L1} N_{L1,u2} \\ \lambda_{L2} N_{L2,u2} \end{bmatrix} + \begin{bmatrix} e_{CA,u1}^P \\ e_{PY,u1}^P \\ \lambda_{L1} \varepsilon_{L1,u1}^P \\ \lambda_{L2} \varepsilon_{L2,u1}^P \\ e_{CA,u2}^P \\ e_{PY,u2}^P \\ \lambda_{L1} \varepsilon_{L1,u2}^P \\ \lambda_{L2} \varepsilon_{L2,u2}^P \end{bmatrix}$$

Even so the linear regression equation is like this equation (19), applying the code pseudoranges and the carrier phases of the receivers 1A(u1), 1B(u2), the receivers' positions u1, u2 and the respective integer ambiguities could be estimated like the above-described equation (18). Consequently the two receivers' positions could be estimated by using only one linear regression equation.

On this equation (19) we use the elements which are related to the L1 carrier wave to estimate. More specifically considering the condition on which only L1 carrier wave could be captured and tailed, and the CA code pseudorange and the L1 carrier phase could be gotten, the expression (19) is re-described to an expression (20).

[Expression 10]

$$\begin{bmatrix} \rho e_{CA,u1}^{(j)} \\ \Phi e_{L1,u1}^{(j)} \\ \rho e_{CA,u2}^{(j)} \\ \Phi e_{L1,u2}^{(j)} \end{bmatrix} = \begin{bmatrix} G_{u1}^{(j)} & 1 & 0 & -G_{D,u1}^{(j)} & -I & I & I & 0 & 0 \\ G_{u1}^{(j)} & 1 & I & -G_{D,u1}^{(j)} & -I & -I & I & 0 & 0 \\ 0 & 1 & 0 & -G_{D,u2}^{(j)} & -I & I & I & G_{u2}^{(j)} & 0 \\ 0 & 1 & 0 & -G_{D,u2}^{(j)} & -I & -I & I & G_{u2}^{(j)} & I \end{bmatrix} \cdot \begin{bmatrix} u1 \\ c\delta t_{u1} \\ \lambda_{L1} N_{L1,u1} \\ p \\ c\delta t^p \\ \delta I_u \\ \delta T_u \\ u2 \\ \lambda_{L1} N_{L1,u2} \end{bmatrix} + \begin{bmatrix} e_{CA,u1}^p \\ \lambda_{L1} \varepsilon_{L1,u1}^p \\ e_{CA,u2}^p \\ \lambda_{L1} \varepsilon_{L1,u2}^p \end{bmatrix}$$

(20)

At this equation, applying the same clock to the receivers 1A (u1), 1B (u2), the clock error of the receiver 1B (u2) is gotten from the clock error of the receiver 1A (u1). So the clock error of the receiver 1B is not used for this linear regression equation.

Defining d as the distance between the receiver 1A (u1), 1B (u2), and defining $\varepsilon_d$ as the setting position error, a condition of constraint described bellow is applied to the equation (20).

[Expression 11]

$$\|u1 - u2\| = \sqrt{\frac{(x1-x2)^2 + (y1-y2)^2 +}{(z1-z2)^2}} = d + \varepsilon_d$$

Applying a Linear Taylor series expansion to the equation (20) with an adaptive estimation values Xe1, Ye1, Ze1, Xe2, Ye2, Ze2, the amount of the observable value of the linear regression equation could be increased.

Applying the linear regression equation described in the equation (20) as like above, by only catching and tracking the L1 carrier wave, the receivers' positions u1, u2, the positions of the satellites s, the clock errors of the satellites $c\delta t^s$, and the integer ambiguity N could be estimated. Said differently, it is not necessary for estimation to catch and track both the L1 and L2 carrier waves and only L1 carrier wave would be required. So we could make a high accurate estimation only using the really observable satellites' signals from the GPS satellite. And the number of the processing is decreased, so the processing speed of the estimation could be faster. At this point defining the number of the satellites 'ns', the number of the explanatory variable which is the unknown value is '8 ns+7, and the number of the objective variable which is observable value is '10 ns'. And the number of the condition of constraint is '1'. So when an inequality expression '8 ns+6≦10 ns which means ns≧3 is implemented, in other word the number of the satellites observed constantly is greater and equal 3, the estimation result could be unspread.

And applying a difference between the elements of the first row and the third row and a difference between the elements of the second row and the forth row to the equation (20), the equation (20) is re-described in an equation (21).

[Expression 12]

$$\begin{bmatrix} \rho e_{CA,u1}^{(j)} - \rho e_{CA,u2}^{(j)} \\ \Phi e_{L1,u1}^{(j)} - \Phi e_{L1,u2}^{(j)} \end{bmatrix} =$$ (21)

$$\begin{bmatrix} G_{u1}^{(j)} & 0 & 0 & -G_{D,u1}^{(j)} + G_{D,u2}^{(j)} & 0 & 0 & 0 & -G_{D,u2}^{(j)} & 0 \\ G_{u1}^{(j)} & 0 & I & -G_{D,u1}^{(j)} + G_{D,u2}^{(j)} & 0 & 0 & 0 & -G_{D,u2}^{(j)} & -I \end{bmatrix} \cdot \begin{bmatrix} u1 \\ c\delta t_{u1} \\ \lambda_{L1} N_{L1,u1} \\ p \\ c\delta t^p \\ \delta I_u \\ \delta T_u \\ u2 \\ \lambda_{L1} N_{L1,u2} \end{bmatrix} +$$

$$\begin{bmatrix} e_{CA,u1}^p - e_{CA,u2}^p \\ \lambda_{L1} \varepsilon_{L1,u1} - \lambda_{L1} \varepsilon_{L1,u2} \end{bmatrix} = \begin{bmatrix} G_{u1}^{(j)} & 0 & -G_{D,u1}^{(j)} + G_{D,u2}^{(j)} & -G_{u2}^{(j)} & 0 \\ G_{u1}^{(j)} & I & -G_{D,u1}^{(j)} + G_{D,u2}^{(j)} & -G_{u2}^{(j)} & -I \end{bmatrix} +$$

$$\begin{bmatrix} e_{CA,u1}^p - e_{CA,u2}^p \\ \lambda_{L1} \varepsilon_{L1,u1} - \lambda_{L1} \varepsilon_{L1,u2} \end{bmatrix}$$

Transforming a term of the integer ambiguity, the equation (21) is re-described in an equation (22).

[Expression 13]

$$\begin{bmatrix} \rho e_{CA,u1}^{(j)} - \rho e_{CA,u2}^{(j)} \\ \Phi e_{L1,u1}^{(j)} - \Phi e_{L1,u2}^{(j)} \end{bmatrix} = \begin{bmatrix} G_{u1}^{(j)} & 0 & -G_{D,u1}^{(j)} + G_{D,u2}^{(j)} & -G_{u2}^{(j)} \\ G_{u1}^{(j)} & I & -G_{D,u1}^{(j)} + G_{D,u2}^{(j)} & -G_{u2}^{(j)} \end{bmatrix}$$ (22)

$$\begin{bmatrix} u1 \\ \lambda_{L1} N_{L1,u1} - \lambda_{L1} N_{L1,u2} \\ s \\ u2 \end{bmatrix} + \begin{bmatrix} e_{CA,u1}^p - e_{CA,u2}^p \\ \lambda_{L1} \varepsilon_{L1,u1}^p - \lambda_{L1} \varepsilon_{L1,u2}^p \end{bmatrix}$$

The linear regression equation could be simplified. At the result the estimation processing speed could be higher, the position estimating speed could be improved.

According to the embodiment of this invention described above, the two receivers' positions, the satellites' positions, and the integer ambiguities could be estimated with high speed by utilizing only one linear regression equation.

Additionally, with the embodiment described above, the number of the GPS receivers is '2', but the number of the GSP receives could be greater or equal '3'. The more the number of the GPS receivers increases, the higher accurate the estimation result is, though the amount of the estimation processing increases. And with the embodiment described above, we estimate the values with the L1 carrier wave and the L2 carrier wave, but the carrier waves which are put to practical use in the future as a L5 carrier wave could be applied.

The invention claimed is:
1. A positioning apparatus comprising:
   antennas which receive satellites signals transmitted from satellites and whose distances from one to another are configured,
   receivers which are set with every antennas respectively and demodulate the satellite signals inputted from the antennas, and a position estimating device which:
- linear-approximates positions of receivers with a Linear Taylor series expansion about estimated positions of the receivers by using estimation results of previous positions of the receivers and positions of satellites with a Linear Taylor series expansion about orbital positions of the satellites by using estimated orbital positions of the satellites from a broadcast orbit data;
- sets up objective variables, as observable values, that include carrier phase integrated values and code pseudoranges related to distances between the antennas and the satellites;
- sets up explanatory variables, as unknown values, that include integer ambiguities, clock errors of the receivers, the positions of receivers, clock errors of the satellites, and the orbital positions of the satellites;
- sets up a regression equation whose operational elements set by an approximate matrix derived from the linear-approximation; and
- estimates at least the positions of receivers and the integer ambiguities by using the regression equation, and detects a point position of the positioning apparatus with the positions of the receivers and the distances of the receivers from each other.

2. The positioning apparatus according to claim 1,
further comprising a satellite's orbit data getting device which gets orbit data of the satellites from a navigation message or estimated values by off-line processing,
wherein the position estimating device applies the orbit data of the satellites to the regression equation and estimates the positions of receivers.

3. The positioning apparatus according to claim 2,
wherein the position estimating device applies a Kalmann Filter to the regression equation.

4. The positioning apparatus according to claim 3,
wherein the position estimating device estimates a geometric center point of the antennas.

5. The positioning apparatus according to claim 4,
wherein the number of the antennas and the receivers are two.

* * * * *